United States Patent Office 3,401,479
Patented Sept. 17, 1968

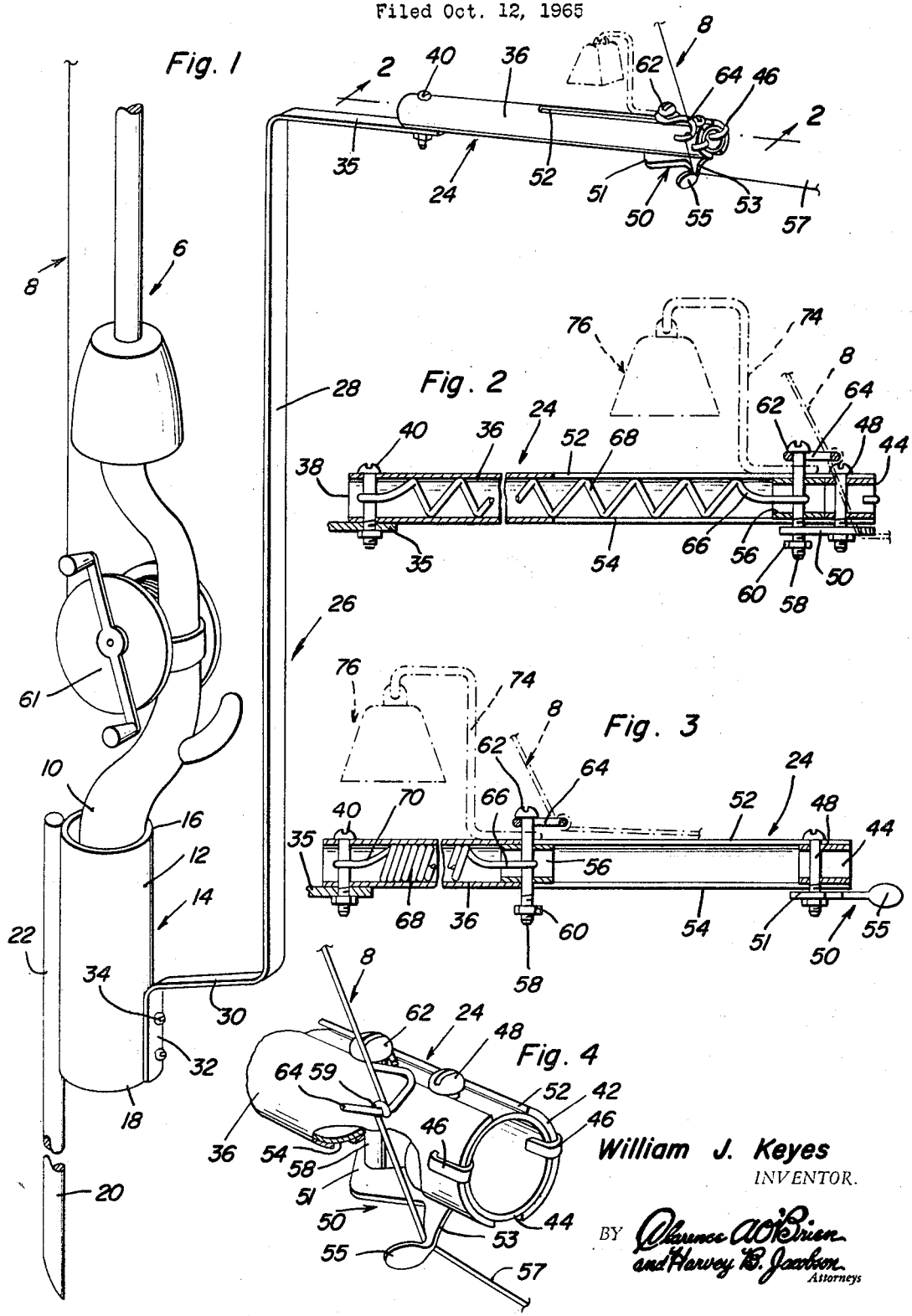

3,401,479
UNATTENDED SIGNAL-EQUIPPED
FISHING DEVICE
William J. Keyes, 3622 S. Lake Park Ave.,
Chicago, Ill. 60653
Filed Oct. 12, 1965, Ser. No. 495,243
3 Claims. (Cl. 43—16)

ABSTRACT OF THE DISCLOSURE

This unattended automatic hook-setting, fish-catching device is characterized by several component parts, namely a rod support embodying a socket for temporary retention of the insertable and removable handle of the fishing rod, one piece bracket means and a bite controlled automatic fish-catching device. The bracket means embodies an elongated strap member having a lower end affixed to one side of the socket. The upper end is bent laterally at an elevation well above the upper end of the socket. The automatic fish-catching device comprises a cylinder having one end bolted to the upper end of the bracket. The cylinder is provided with a spring-loaded, line-yanking hook to which a portion of the fishing line is connected. The hook embodies fishhook setting and releasing pin means which are slidably mounted in the cylinder. The pin setting and releasing means embodies a trigger latch pivotally mounted on the cylinder and provided with a catch which is releasably engageable with the pin. A bite actuated trip finger is actuated by a coacting portion of the fishing line which is trippably engaged therewith.

---

The present invention relates to unattended automatic hook-setting fish-catching devices and has to do with a holder for the handle portion of a readily insertable and removable rod and reel, a spring-loaded line pulling and hook setting device, and bracket means mounting and supporting said device on a component part of the holder and wherein said device when released by a pull on the fishing line functions to forcibly jerk the line and set the fishhook in the mouth of the fish.

One aspect of the over-all concept has to do with a holder for a conventional-type rod and reel similar, structurally and functionally, to the stake-equipped socket shown in Beck's fishing device 2,766,543 to which reference may, if desired, be made. An object of the present invention is to structurally, functionally and in other ways improve upon the Beck patent and, in addition, on the spring-loaded automatic line puller and catcher in the Zenewich Patent 2,295,250.

In carrying out the principles of the present invention, simple and novel bracket means is secured to and carried by the socket of the rod holder. This bracket means is unique in that it embodies a terminal upper end portion which is horizontal and located at a level at a prescribed plane above the top of the socket. A bite controlled automatic fish catching device is mounted on this upper end portion. More particularly, the device is characterized by a horizontally elongated cylinder which has a spring-loaded line yanking hook with which a minimal portion of the fishing line is operatively connected. This hook or hook means embodies a hook setting and releasing pin slidingly mounted in and on the cylinder. A pin setting and releasing means is also provided on the cylinder and embodies a trigger latch which is pivotally mounted on the cylinder and is provided with a catch releasably engageable with the pin. A bite actuated trip finger is embodied to accommodate a minimal portion of the bite actuated fishline.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of the over-all apparatus showing the holder, insertable and removable fishing rod, supporting bracket, and automatic fish catcher (with or without a signal bell) and with the fishline readied to make a catch.

FIG. 2 is an enlarged view in section and elevation taken on the plane of the section line 2—2 of FIG. 1.

FIG. 3 is a view like FIG. 2 showing the relationship of the component parts when the fishline has been pulled in a manner to make the catch.

And FIG. 4 is an enlarged fragmentary-perspective view which functions to show the details of construction of the trippable latch means.

Referring to FIG. 1 the rod and reel is denoted generally at 6, the line at 8 and handle at 10. The grip of the handle means is fitted removably and telescopingly in a vertical socket 12 constituting a part of the portable rod holder 14. The socket is open at its upper and lower ends as at 16 and 18. While anchoring means other than that shown could be employed to hold the socket in place, it is usually provided with a pointed rod-type stake 20 whose shank portion 22 is affixed to one exterior surface or side of the socket. The automatic fish catching device is denoted by the numeral 24 and is supported in a desired position by way of a supporting and elevating bracket 26. This bracket is preferably formed from a single length of strap metal of suitable gauge and length. The main vertical portion 28 constitutes the upright and the lower end 30 is bent laterally and has a terminal portion 32 which is affixed to the lower open end portion of the socket diametrically opposite the shank 22 by way of suitable fasteners 34. The upper lateral end portion 35 serves to elevate and support the automatic fish catching device or means 24.

The last named means comprises a horizontal elongated cylinder 36, one open end portion 38 of which is superimposed atop and bolted as at 40 to the arm 35. The major portion of the tube or cylinder projects beyond the free end of the arm and the outer end 42 (see FIG. 4) is provided with a sleeve-type insert 44 which is clipped or otherwise held in place as at 46. This sleeve is flush at its outer end with the corresponding outer end 42 of the cylinder. This insert or sleeve is provided with a bolt and nut 48 which serves as a support and holder for a trippable trigger 50. Before going into detail with respect to this trigger or trip latch it is to be pointed out that the right hand end portion of the cylinder is provided in top and bottom sides thereof with diametrically opposite keying slots 52 and 54 which open through the right hand end of the cylinder to permit insertion and removal of the assembling and mounting bolt 48.

The sleeve 44 is differentiated from a similar relatively movable sleeve which is designated as the second or sliding sleeve and this is denoted at 56. For further distinction sleeve 44 constitutes a "first" sleeve and sleeve 56 constitutes a "second" sleeve. The second sleeve is also provided with a bolt 58 which is much longer than the relatively short bolt 48 and is provided at its lower end with a retaining and assembling nut 60. The bolt passes midway between the ends of the second sleeve 56 with portions slidingly keyed for operation in the keyways or slots 52 and 54. The upper headed end of this bolt is denoted at 62 and is provided with a bent wire line-attaching hook 64 as shown best in FIG. 4. The hook 64 is also referred to as the line attaching and yanking hook. The lower depending end portion of the bolt 58 constitutes a keeper pin. One end portion 66 of a coil spring 68 is attached to the median part of the bolt or pin 58 as shown in FIGS. 2 and 3. The other end portion 70 is fastened to the aforementioned bolt and nut assembly 40 which, as previously mentioned, is carried by and is also used to attach the end portion 38 to the arm 35 of the bracket means 26. The tension of the spring normally holds the sliding pin or bolt 58 in the position shown in full lines in FIG. 3. Incidently, this pin can also be used as a holder and carrier for a secondary or auxiliary bracket 74 which carries a suitable signalling bell 76.

With further respect to the pin setting holding and releasing trigger latch this part comprises a hook-like catch 51 (see FIG. 4) at the rearward or inward end which is releasable with the keeper pin 58. In addition, the forward end is provided with a lateral outwardly projecting finger portion 53 which terminates in a lobe-like terminal or trip finger 55. The trigger latch comprises therefore a simple one-piece clip that has a flat median body portion which is detachably connected with the pivot bolt 48 as shown, a coplanar flat-like hook terminal at its rear end as at 51 angularly directed toward and engageable with the keeper pin 58. It will be noted, too, that the portion 53 is angled outwardly and obliquely in a direction opposite to the catch 51 and has the aforementioned upstanding or lobe-like terminal 55 which constitutes the trip finger for the portion 57 of the fishing line. The portion 59 is engageable with the spring yanked hook 64. It follows that after catch 51 is engaged with pin 58 the line 8 from the reel 61 on the rod is rigged in the manner shown, that is, is looped around the hook 64 and is then engaged with the portion 53 in trip finger 55 at which time the spring 68 is under tension or extended as shown in FIG. 2. The device is thus set to make a catch. When the fish exerts a pull on the line 57 the trigger latch or trip means 50 comes into play and releases the catch 51 from keeper pin 58 whereupon the pin travels from right to left in the slot means under the tension of the spring and the line is yanked in a manner to set the hook in the mouth of the fish in a seemingly evident manner. The signalling bell is optional but in actual use has been used quite successfully. Inasmuch as the usual angler has several more or less of these holders and catchers set up for simultaneous use it will be evident that the signalling means often comes in as a worthwhile contributory feature.

In practice, the holder and fishing device is set up for use in the manner shown in FIG. 1 and is cocked by stretching the spring means and engaging the latch means with the keeper pin. When the portion 57 (with baited hook or lure thereon) is taken by the fish, the pull exerted imposes a stress on the latch or trigger means and the latter is released whereupon the spring comes into play to make the catch in what is believed to be a generally well-known manner.

Minor changes in shape, size, materials and rearrangement of component parts may be resorted to in actual practice.

What is claimed as new is as follows:

1. In combination, an elongated open-ended cylinder having elongated duplicate guide slots in diametrically opposite top and bottom sides of said cylinder, a sleeve slidingly confined in the bore of said cylinder, a pin having a median portion affixed to and carried by said sleeve and having upper and lower end portions keyed and slidable in and projecting above and below the respective guide slots, a line attaching and yanking hook carried by the projecting upper end portion of said pin, the lower projecting end portion of said pin constituting a depending keeper, a coil spring confined in the bore of said cylinder and having a rearward end anchored on a bolt and nut assembly located at a corresponding rearward end of said cylinder and a forward end connected with a cooperating median portion of said pin, and a pin setting, holding and releasing trigger latch arranged beneath and exteriorly of a forward end portion of said cylinder, pivotally mounted on said forward end portion and embodying a catch at its rearward end releasably engageable with said keeper, and a trip finger at its forward end with which a pull actuated portion of a fishing line is trippably engageable.

2. The structure according to claim 1, and wherein said trigger latch comprises a one-piece clip having a flat median body portion detachably connected with said pivot means, a coplanar flat hook-like terminal at its rearward end angularly directed toward said keeper and defining and providing said catch, the forward end of said clip being angled obliquely in a direction oposite to the direction of said catch, projecting outwardly beyond the adjacent surface of the cylinder and having an upstanding lobe-like terminal defining and providing said trip finger.

3. The structure defined in and according to claim 1 and, in combination, a fishing rod support embodying a vertically disposed socket open at its upper end for removable reception and ready withdrawal of the handle portion of said fishing rod, means carried by one side at the lower end of said socket whereby said socket can be removably anchored on a relatively stationary support for unattended use, a one-piece bracket, said bracket comprising a vertically elongated strap member providing an upstanding arm, said arm extending to a height well above the open upper end of said socket, the lower end of said strap member being laterally offset and affixed on a side of the socket diametrically opposite the aforementioned socket anchoring means, the upper end of said strap member being laterally bent in a direction forwardly of the vertical axis of said socket, and the aforementioned bolt and nut assembly providing not only an anchor for the cooperating end of the coil spring but being detachably fastened to said laterally directed upper end, and said bolt and nut assembly being at right angles to the longitudinal axis of said cylinder and aligned with the aforementioned guide slots.

References Cited

UNITED STATES PATENTS

| | | | |
|---|---|---|---|
| 1,934,536 | 11/1933 | Hawkinson | 43—16 |
| 2,659,174 | 11/1953 | Leach | 43—15 |
| 2,766,543 | 10/1956 | Beck | 43—16 |

SAMUEL KOREN, *Primary Examiner.*

D. J. LEACH, *Assistant Examiner.*